(12) United States Patent
Lee

(10) Patent No.: US 8,641,111 B2
(45) Date of Patent: Feb. 4, 2014

(54) TOOL WITH ATTACHMENT FOR COLLECTING DEBRIS AND METHOD OF USING THE SAME

(76) Inventor: Gordon Lee, Kanata (CA)

(*) Notice: Subject to any disclaimer, the term of this patent is extended or adjusted under 35 U.S.C. 154(b) by 267 days.

(21) Appl. No.: 13/091,216

(22) Filed: Apr. 21, 2011

(65) Prior Publication Data

US 2011/0262260 A1 Oct. 27, 2011

Related U.S. Application Data

(60) Provisional application No. 61/327,457, filed on Apr. 23, 2010.

(51) Int. Cl.
*A01B 1/02* (2006.01)

(52) U.S. Cl.
USPC .......................... 294/50.9; 294/58; 294/50.8

(58) Field of Classification Search
USPC ........ 294/50.9, 58, 50.7, 50.8, 51, 53.4, 54.5; 37/265, 284, 285; 16/112.1, 426; 403/113, 164, 167
See application file for complete search history.

(56) References Cited

U.S. PATENT DOCUMENTS

| | | | |
|---|---|---|---|
| 2,015,109 A * | 9/1935 | Hays ............................ | 294/50.9 |
| 2,891,374 A | 6/1959 | Richmond | |
| 3,095,682 A | 7/1963 | Pasquine | |
| 3,264,809 A | 8/1966 | Jackson | |
| 3,369,834 A * | 2/1968 | Miles ........................... | 294/50.9 |
| 4,018,038 A | 4/1977 | Sipe | |
| 4,292,794 A * | 10/1981 | Gascon ......................... | 294/50.9 |
| 4,378,671 A * | 4/1983 | Gascon ......................... | 294/50.9 |
| 4,948,188 A | 8/1990 | Haslam | |
| 4,953,347 A | 9/1990 | Siegfried | |
| 4,991,386 A | 2/1991 | Dirksen | |
| 5,114,199 A | 5/1992 | Newcomer | |
| 5,303,536 A | 4/1994 | Tolliver | |
| 5,472,252 A | 12/1995 | Barone | |
| 5,558,378 A | 9/1996 | Byrd | |
| 5,901,540 A | 5/1999 | Vella | |
| D411,943 S | 7/1999 | Beaver | |
| 6,367,236 B1 | 4/2002 | Marcone | |
| 6,619,023 B1 | 9/2003 | Marcone | |
| 7,131,255 B1 | 11/2006 | Caneba | |
| 7,661,258 B1 * | 2/2010 | Petruzelli .................... | 56/400.12 |
| 7,819,447 B1 * | 10/2010 | Ange ........................... | 294/50.9 |
| 2002/0139101 A1 | 10/2002 | Crites | |

* cited by examiner

*Primary Examiner* — Paul T Chin
(74) *Attorney, Agent, or Firm* — Victoria Donnelly; IP-Mex Inc.

(57) ABSTRACT

An attachment to a shovel having a shovel head and a handle is provided, converting the shovel into a tool for collecting debris. The attachment has a clamping head and a pivot arm shorter than the shovel handle, and a pivot for attaching the attachment to the shovel handle. The attachment is movable between a closed position when the shovel head and the clamping head are juxtaposed face to face forming a tunnel therebetween, and an open position when the shovel head and the clamping head are spaced apart. In operation, the clamping head is moved into an open position to collect debris, and then moved into a closed position towards the shovel head to secure the debris, followed by rotating the tool by 90° plus an offset angle, thereby causing the clamping head to open under its weight and the debris to fall through the tunnel.

20 Claims, 14 Drawing Sheets

TOOL WITH ATTACHMENT FOR COLLECTING DEBRIS AND METHOD OF USING THE SAME

CROSS REFERENCE TO RELATED APPLICATIONS

The present patent application claims benefit from the U.S. provisional application Ser. No. 61/327,457 filed on Apr. 23, 2010 for "Gardening Tool Attachment, and Gardening Tool and Method of Using the Same", the entire contents of which are incorporated herein by reference.

FIELD OF THE INVENTION

This invention generally relates to tools for collecting debris, and in particular, to a gardening tool with attachment for collecting debris, and a method of using the gardening tool, for example, for assisting in the cleanup of garden debris including leaves.

BACKGROUND OF THE INVENTION

Cleaning debris, including garden debris, is a physical chore, often involving manual labour such as raking leaves and twigs, picking them by hand or shovel, and dumping into a garbage receptacle. The garden debris is often wet, difficult to collect and insert into the garbage receptacle efficiently and accurately because of the small opening of the garbage receptacle.

Accordingly, there is a need in the industry for the development of a simple, yet efficient tool for collecting debris, which would simplify the collection and disposal of debris.

SUMMARY OF THE INVENTION

There is an object of the present invention to provide a tool for collecting debris, which would simplify the collection and disposal of debris.

There is another object of the invention to provide at attachment for a conventional household tool to convert the household tool into the tool for collecting debris, which would simplify the collection and disposal of garden debris.

There is yet another object of the invention to provide a method of using the attachment and the tool for collecting and disposing debris.

In the embodiments of the invention, the gardening tool is a shovel, and the attachment to the gardening tool is the attachment to the shovel, for example, to a common snow push shovel.

According to one aspect of the invention, there is provided a tool, comprising:
 a shovel having a shovel head for collecting debris and a shovel handle extending therefrom; and
 an attachment, comprising:
  an attachment member comprising:
   pivot arm, which is shorter than the shovel handle, the pivot arm having a clamping end and a pivot end;
   a clamping head attached to the clamping end; and
   a pivot attached to the pivot arm for pivotally connecting the attachment to the shovel handle;
  the attachment member being movable between a closed position when the shovel head and the clamping head are juxtaposed face to face forming a tunnel therebetween having a tunnel axis along the tunnel, and an open position when the shovel head and the clamping head are spaced apart from each other.

The tool further comprises a means for moving the clamping head between the closed position and the open position.

In an embodiment of the invention, the means for moving comprises a clamping handle pivotally connected to one of the clamping head or the pivot arm. Conveniently, a length of the clamping handle is between 0.3-0.5 of a length of the shovel handle.

The tool further comprises a limiter for limiting a distance between the clamping head and the shovel head in the open position.

In the embodiments of the invention, the limiter one of the following:
 a pin, which is attached to the pivot arm and is slidably movable in a slot; or
 the pivot end is configured to act as the limiter.

In the tool described above, friction in the pivot and weight of the attachment member are selected so that a component of the weight causing the clamping head move away from the shovel head is greater than the friction when the tool is rotated. An angle $\beta$ of rotation of the tool is such that the tunnel axis is offset from the direction of gravity by an offset angle $\alpha$ which is smaller than 90 degrees, and $\beta=90°+\alpha$.

For the convenient operation of the tool, a projection of a length of the pivot arm is equal to or shorter than about ⅕-⅙ of a length of the shovel handle.

In the tool of the embodiments of the invention, the clamping head has a lower edge and an upper edge, the upper edge being closer to the pivot, the lower edge and the upper edge defining a clamping head plane, the shovel handle having a distal end and a proximal end defining a handle axis, the handle axis being inclined relative to the clamping head plane by about 20-40 degrees.

The clamping head comprises a first section and a second section configured to slide against each other for adjusting a width or a length of the clamping head.

According to another aspect of the invention, there is provided an attachment for a shovel having a shovel handle and a shovel head for collecting debris, the attachment comprising:
 a pivot arm, which is shorter than the shovel handle, the pivot arm having a clamping end and a pivot end;
 a clamping head attached to the clamping end;
 a pivot attached to the pivot arm for pivotally connecting the attachment to the shovel handle;
 the clamping head being movable between a closed position when the shovel head and the clamping head are juxtaposed face to face forming a tunnel therebetween, and an open position when the shovel head and the clamping head are spaced apart from each other.

The attachment further comprises a means for moving the clamping head between the closed position and the open position.

In an embodiment of the invention, the means for moving comprises a clamping handle pivotally connected to one of the clamping head or the pivot arm. Conveniently, a length of the clamping handle is between 0.3-0.5 of a length of the shovel handle.

The attachment further comprises a limiter for limiting a distance between the clamping head and the shovel head in the open position.

In the embodiments of the invention, the limiter one of the following:
 a pin, which is attached to the pivot arm and is slidably movable in a slot; or
 the pivot end is configured to act as the limiter.

In the attachment described above, friction in the pivot and weight of the attachment member are selected so that a component of the weight causing the clamping head move away from the shovel head is greater than the friction when the tool is rotated. An angle β of rotation of the tool is such that the tunnel axis is offset from the direction of gravity by an offset angle α which is smaller than 90 degrees, wherein β=90°+α.

For the convenient operation of the attachment, a projection of a length of the pivot arm is equal to or shorter than about ⅕-⅙ of a length of the shovel handle.

In the attachment described above, the clamping head has a lower edge and an upper edge, the upper edge being closer to the pivot, the lower edge and the upper edge defining a clamping head plane, the shovel handle having a distal end and a proximal end defining a handle axis, the handle axis being inclined relative to the clamping head plane by about 20-40 degrees.

The clamping head of the attachment comprises a first section and a second section configured to slide against each other for adjusting a width or a length of the clamping head.

According to yet another aspect of the invention, there is provided a method for operating a tool, comprising a shovel having a shovel head for collecting debris and a shovel handle extending therefrom, and an attachment, comprising an attachment member having a pivot arm, which is shorter than the shovel handle, the pivot arm having a clamping end and a pivot end, a clamping head attached to the clamping end, and a pivot attached to the pivot arm end for pivotally connecting the attachment to the shovel handle, the method comprising:
(a) bringing the attachment in an open position when the shovel head and the clamping head are spaced apart from each other;
(b) loading debris onto the shovel head;
(c) bringing the attachment in a closed position when the shovel head and the clamping head are juxtaposed face to face forming a tunnel therebetween having a tunnel axis along the tunnel and two tunnel openings at respective ends of the tunnel;
(d) transporting the tool to a position above a container having an opening for collecting debris; and
(e) rotating the tool to release the debris through one of the tunnel openings into the opening of the container.

The step (e) comprises positioning the tunnel axis substantially vertical.

In the embodiments of the invention, the step (e) comprises rotating the tool so that a component of a weight of the attachment member causes the clamping head move away from the shovel head, thereby releasing the debris into the container.

In more detail, the step (e) comprises rotating the tool so that the tunnel axis is offset from the direction of gravity by an offset angle, which is smaller than 90 degrees.

The method further comprises limiting a distance between the clamping head and the shovel head in the open position.

The method further comprises adjusting a width or a length of the clamping head.

Thus, an improved tool for collecting debris, and the method of operating the same have been provided.

BRIEF DESCRIPTION OF THE DRAWINGS

Embodiments of the invention will be described with reference to the attached drawings, in which:
FIG. 1b 1 is a side view of an attachment of the embodiment of the invention;
FIG. 8b shows a top view of the pivot of FIG. 8a.

DETAILED DESCRIPTION OF THE EMBODIMENTS OF THE INVENTION

Figure 1A:
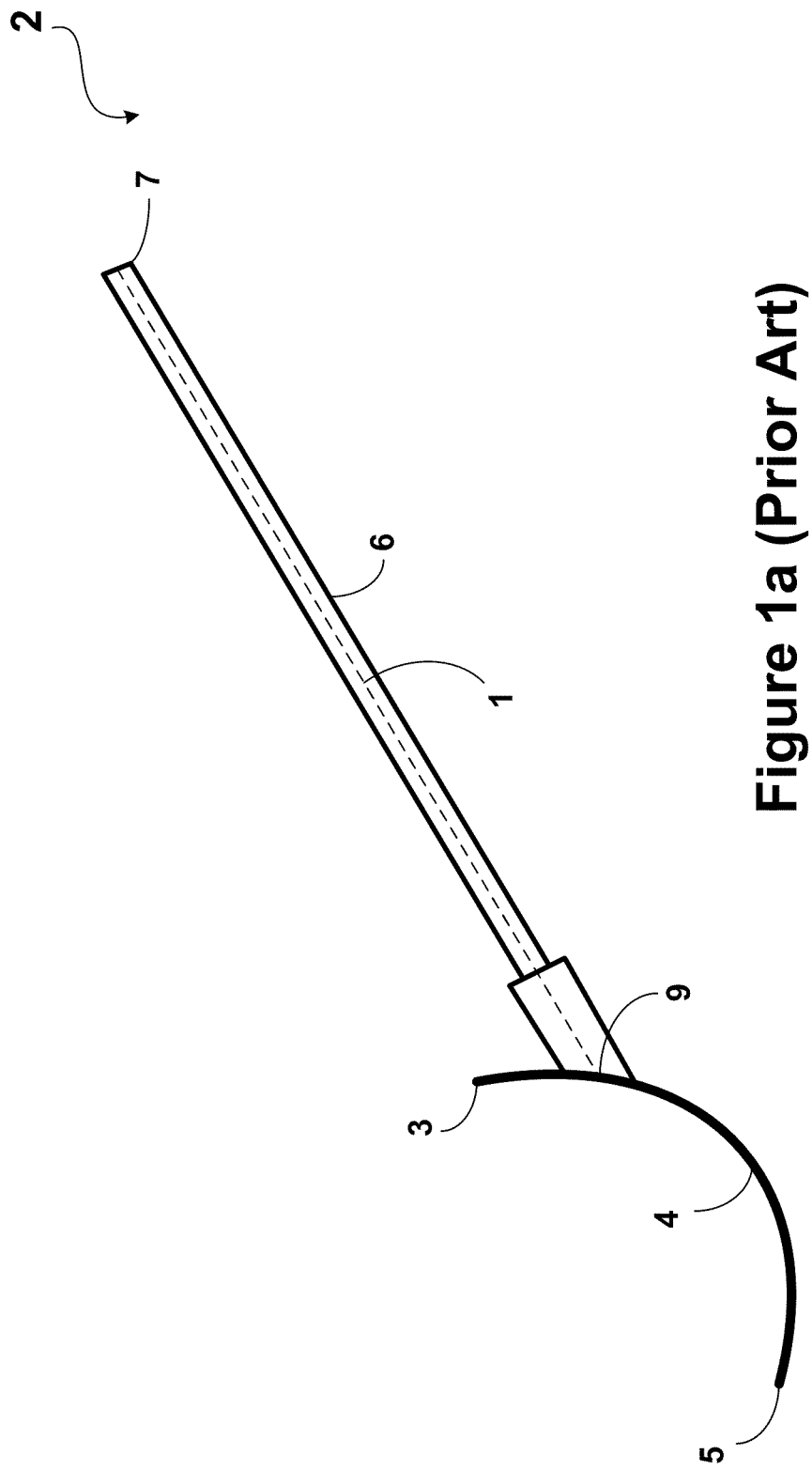
FIG. 1a is a side view of a conventional prior art shovel.

An embodiment of the present invention is further described with the reference to FIGS. 1a, b.

FIG. 1a shows a side view of a conventional snow shovel 2 having a shovel head 4 and a shovel handle 6. The shovel handle 6 has a distal end 7 and a proximal end 9, the distal end 7 and the proximal end 9 defining a handle axis 1. The shovel head 4 has a substantially cylindrical shape with an upper edge 3 and a lower edge 5.

If the shovel handle 6 has a shape of a cylindrical rod as shown on FIG. 1a, the handle axis 1 substantially coincides with the axis of the cylindrical rod. However, there are shovel models with shovel handles of more complex shape, for example, a shovel handle having a combination of several straight and curved sections. In this case, the above definition of the handle axis 1 through the distal end 7 and the proximal end 9 of the shovel handle 6 applies.

Figure 1B:
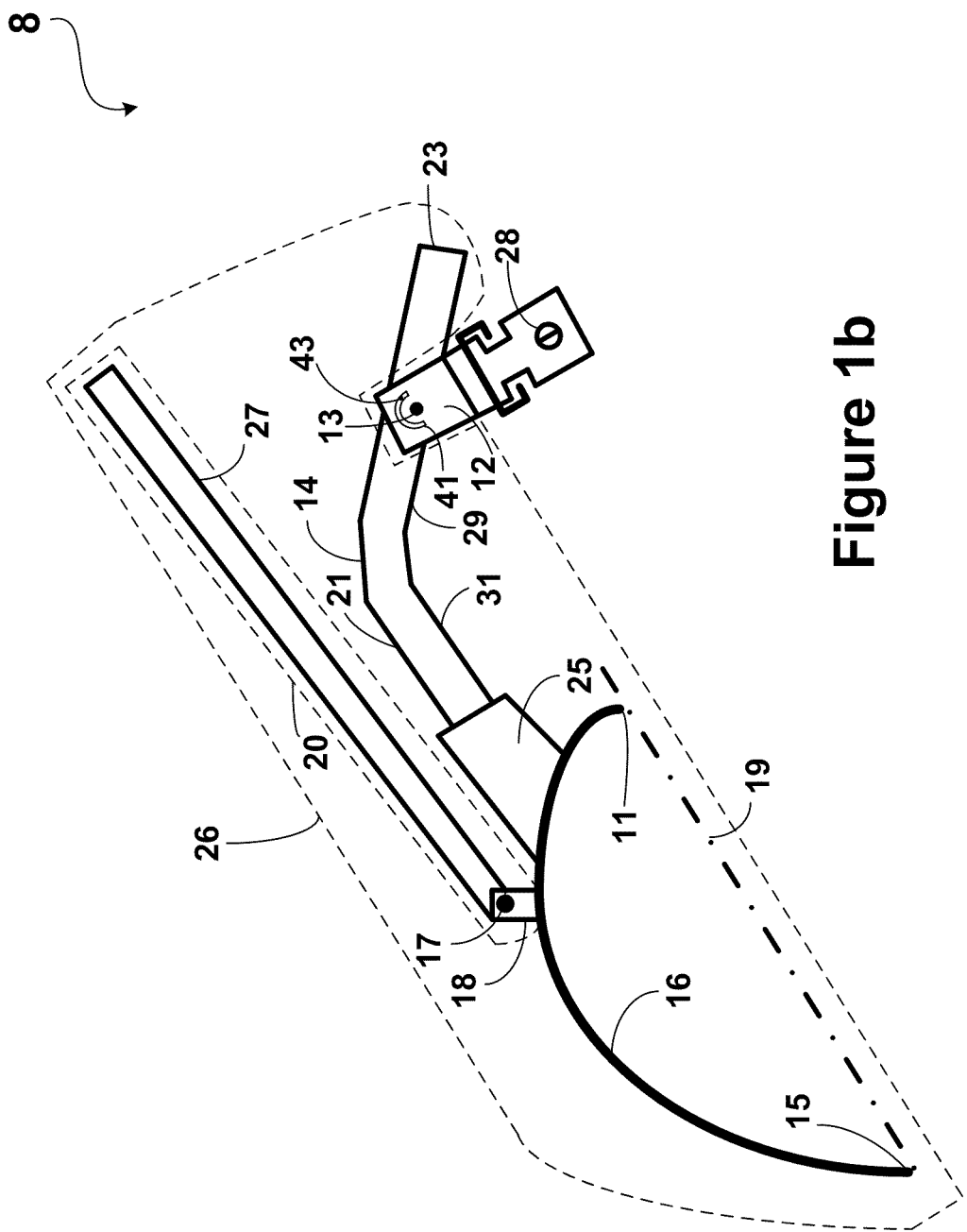

FIG. 1b shows a side view of an attachment to the tool for collecting debris according to the embodiment of the present invention, to be also referred to as a gardening tool attachment (GTA) 8 of the embodiment of the invention.

The GTA 8 comprises an attachment member 26 and a pivot 28. The attachment member 26 comprises a clamping head 16, a socket 25, and a pivot arm 14, which is shorter than the shovel handle 6.

Additionally, the attachment conveniently comprises a clamping handle 20 pivotally connected to the clamping head 16, thus forming a means for moving the clamping head between a closed position when the shovel head 4 and the clamping head 16 are juxtaposed face to face to each other, and an open position when the shovel head 4 and the clamping head 16 are spaced apart from each other.

Conveniently, the length of the clamping handle 20 is between 0.3-0.5 of the length of the shovel handle 6 along the handle axis 1.

Alternatively, the clamping handle 20 may be pivotally connected to the pivot arm 14 or to the socket 25 instead of the clamping head 16.

The clamping handle 20 comprises a handle 27, a support bracket 18, and a support bracket pin 17.

The clamping head 16 has a substantially cylindrical shape with a top edge 11 and a bottom edge 15, said edges being substantially contained in a clamping head plane 19 shown in FIG. 1b by a dashed line. The socket 25 and the support bracket 18 are fixed to the clamping head 16. The handle 27 is rotationally attached to the support bracket 18 by the support bracket pin 17.

As mentioned above, the pivot arm 14 is shorter than the shovel handle 6, and has a first section 29 having a pivot end 23 and a pin 43 protruding from the pivot arm 14, and a second section 31 having a clamping end 21. The clamping end 21 partially extends into the socket 25 providing a reliable connection of the pivot arm 14 to the clamping head 16.

Figure 2:
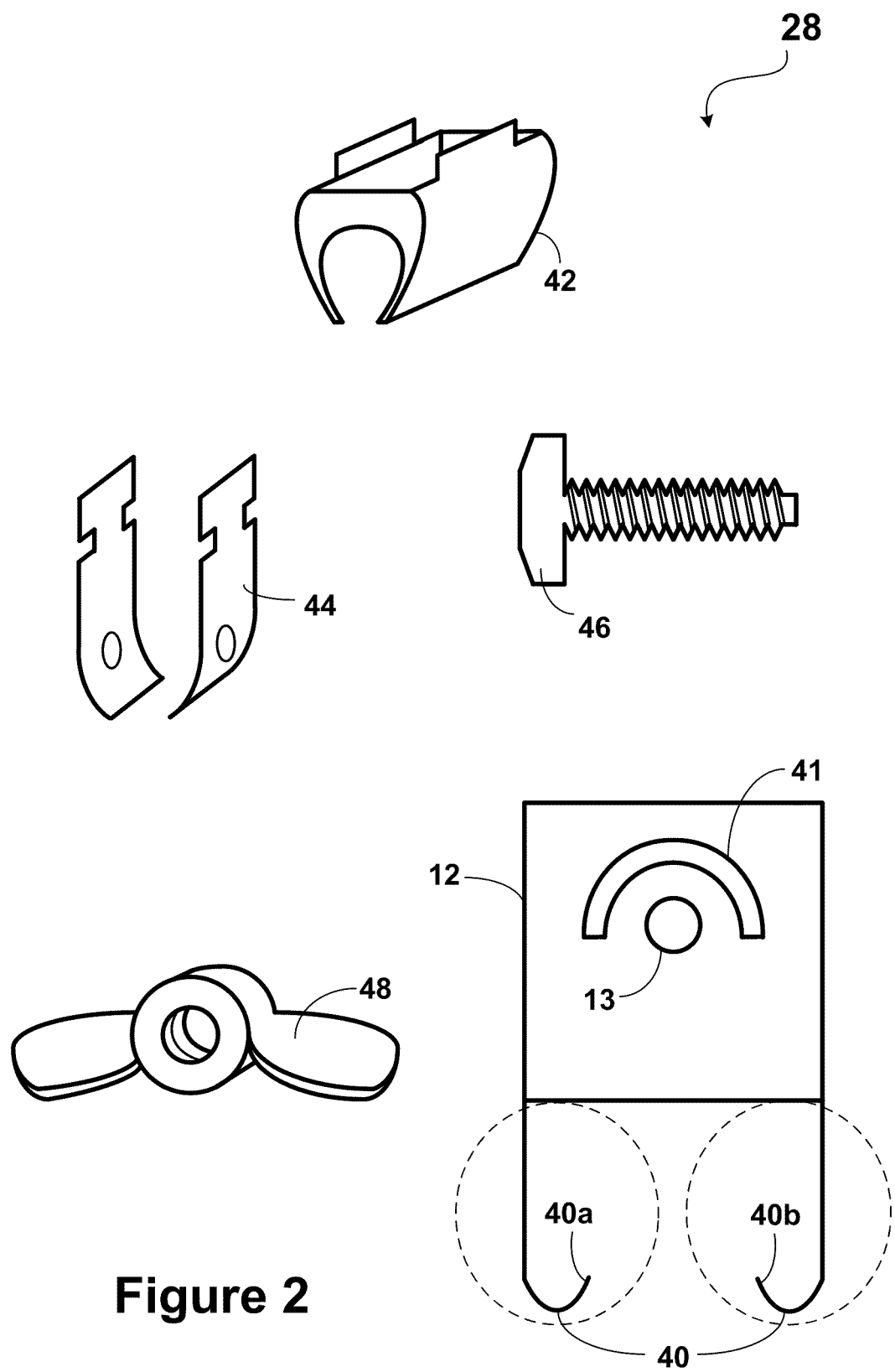
FIG. 2 shows the components of a pivot pf the attachment of FIG. 1b.

The pivot 28, also shown in more detail in FIG. 2, comprises a U-bracket 12 having a slot 41 and a U-bracket pin 13 outside of the slot 41, a first and second inward curving rails 40a and 40b forming a strut channel 40, a pipe cushion liner (PCL) 42 having two PCL tabs, two metal strut clamps 44, a bolt 46, and a wing nut 48.

The PCL 42 is fitted over the shovel handle 6 with two tabs facing the same direction as the shovel face. The strut channel 40 with the U-bracket 12 mounted on top is then placed over the PCL tabs with the PCL tabs fitting between inward curving rails 40a and 40b of the strut channel 40. Each metal strut clamp 44 is slid onto opposite sides of the strut channel 40 with notched openings of the strut clamps fitting between the inward curving rails 40a and 40b of the strut channel 40. The bolt 46 and wing nut 48 are then used to tighten the strut clamps 44, which compresses the PCL 42 against the shovel handle 6 to prevent movement.

The attachment member 26 is connected to the pivot 28 by rotationally fixing the second section 29 of the pivot arm 14 to the U-bracket 12 using the U-bracket pin 13. The pivot 28 connects the GTA 8 to the shovel handle 6.

To start practicing the present invention, the GTA 8 of FIG. 1b needs to be attached to the shovel 2 of FIG. 1a. The shovel 2 with the GTA 8 attached is further referred to as a tool 10 for collecting debris, the tool 10 being shown in FIG. 3a in a closed position when the shovel head 4 and the clamping head 16 are juxtaposed face to face forming a tunnel 50 therebetween, and in FIG. 3b in an open position when the shovel head 4 and the clamping head 16 are spaced apart from each other.

Since the GTA 8 is a seasonal device, and the shovel 2 may be used all year around for various types of jobs with or without the GTA 8 attached, frequent re-attachments of the GTA 8 are expected. However, as the GTA 8 is moved into the open position shown in FIG. 3b, the GTA 8 would create a torque around the shovel handle 6, causing the pivot 28 to slip in the area of contact with the shovel handle 6, thus causing the GTA 8 to rotate around the shovel handle 6. Said rotation may cause damage to the shovel handle 6 in a form of splinters or dents in the shovel handle 6, which is not acceptable. Therefore, the GTA 8 attachment to the shovel handle 6 needs to be strong enough to avoid the rotation. However, shovel handles are customarily made of wood which is not designed to withstand high pressure applied to it. Strong attachment may cause damage to the shovel handle 6 and therefore needs to be avoided. Thus, there are conflicting requirements to the GTA 8 attachment, namely said attachment needs to be simultaneously sufficiently strong and sufficiently weak. Additionally, shovel handles from different manufacturers have different diameters, typically ranging from 1.17" to 1.25". Even if the two requirements mentioned above were satisfied for the shovel 2 with the handle diameter of 1.25", the attachment of the GTA 8 to the shovel handle 6 with the handle diameter of 1.17" would likely become too loose to prevent the rotation of the GTA 8. Similarly, if the conflict between the two previous requirements were successfully resolved for the shovel 2 with the handle diameter of 1.17", the attachment of the GTA 8 to the shovel handle 6 of 1.25" in diameter would likely to be excessively strong. Thus, the attachment of the GTA 8 to the shovel handle 6 needs to accommodate all diameters of the shovel handles from the above mentioned range, which is a third requirement and which is in conflict with the two previous requirements discussed above.

The embodiments of the present invention resolve the conflict between these three requirements by providing a strut channel 40 and a PCL 42 shown on FIG. 2. The PCL 42 provides a flexible elastomeric cushion that is placed on the shovel handle 6, made for example of thermoplastic material, see for example a TaylorStrut™ clamp manufactured by Taylor corporation. The metal clamp 44 is hooked onto the strut channel 40, placed over the PCL 42 and tightened using the bolt 46 and the wing nut 48. The PCL 42 can be subjected to higher pressure than other materials, such as metals, without causing damage to the shovel handle 6, since the pressure is uniformly distributed across the contact area between the PCL 42 and the shovel handle 6. Additionally, for a given clamping pressure, the PCL 42 provides more friction than other materials, such as metals. A combination of higher clamping pressure, more friction, and uniform distribution of the higher clamping pressure across the contact area between the pivot 28 and the shovel handle 6 helps to prevent undesirable rotation of the GTA 8 around the shovel handle 6 without damaging the shovel handle 6. An adjustment of the clamping pressure to the range of diameters of the shovel handles is performed by loosening or tightening of the bolt 46 using the wing nut 48, as appropriate. As an additional benefit, the PCL 42 reduces vibrations and eliminates corrosion if two dissimilar metals are used for the strut channel 40 and for the metal clamp 44.

The design of the pivot arm 14 of the GTA 8 has been chosen to satisfy several criteria. Firstly, the design provides a minimum height clearance "A" required for accommodating the upper edge 3 of the shovel head 4. The minimum height clearance "A" is measured from the upper edge 3 of the shovel head 4 to the shovel handle 6 and has been determined experimentally to be 3.25".

Also a pivot arm height clearance "B" is measured from the shovel handle 6 to the second section 31 of the pivot arm 14, which has been determined experimentally to be around 4.5".

Secondly, the design of the pivot arm 14 provides for as short U-bracket 12 as possible to minimize lateral flexing of the U-bracket and reduce thickness of walls of the U-bracket 12. These criteria have been met by bending the pivot arm 14 approximately in the middle so that the pivot arm 14 has first and second sections 29 and 31 respectively as shown on FIG. 1b. The second section 31 is substantially parallel to the handle axis 1. The first section 29 extends from the U-bracket 12 to commence an angle of about 45° with the handle axis 1, or about 135° with the second section 31, allowing for a shorter U-bracket which height "C" is about 3". In the embodiment of the invention, the length of the first section 29 is about 4", and the length of the second section is about 5".

A rubber washer (not shown) is placed between the pivot arm 14 in the area of the pin 13 and the walls of the U-bracket 12 to reduce friction forces, which would have occurred had the pivot arm made contact with the walls of the U-bracket 12.

Careful consideration has been given to the length of the pivot arm 14, which determines the point of attachment of the GTA 8 to the shovel handle 6. If the pivot arm 14 is too short then the clamping head 16 would cut through the debris as the clamping head 16 closes in the closed position shown in FIG. 3a. Too long pivot arm 14 would result in too much rotational torque when the shovel handle 6 slightly turns during transportation of debris to a garbage container, making it difficult to maintain control of the tool 10.

Too long pivot arm 14 would also allow too much flex and cause the clamping face 16 to wobble side to side when manipulated. Finally, too long pivot arm 14 would cause undesired interference of the metal clamp 44 with the ability of an operator to grip a lower portion of the shovel handle 6 in the proximity of the shovel head 4 for proper leverage when lifting the tool 10. Experimenting with the length of the pivot arm 14 has shown that the length "L" of the projection of the pivot arm 14 on the handle axis 1 should be about $L=\frac{1}{5}-\frac{1}{6}$ of the length of the handle axis 1 to resolve the above noted problems. In the embodiment of the invention, L~7.75".

Figure 3A:
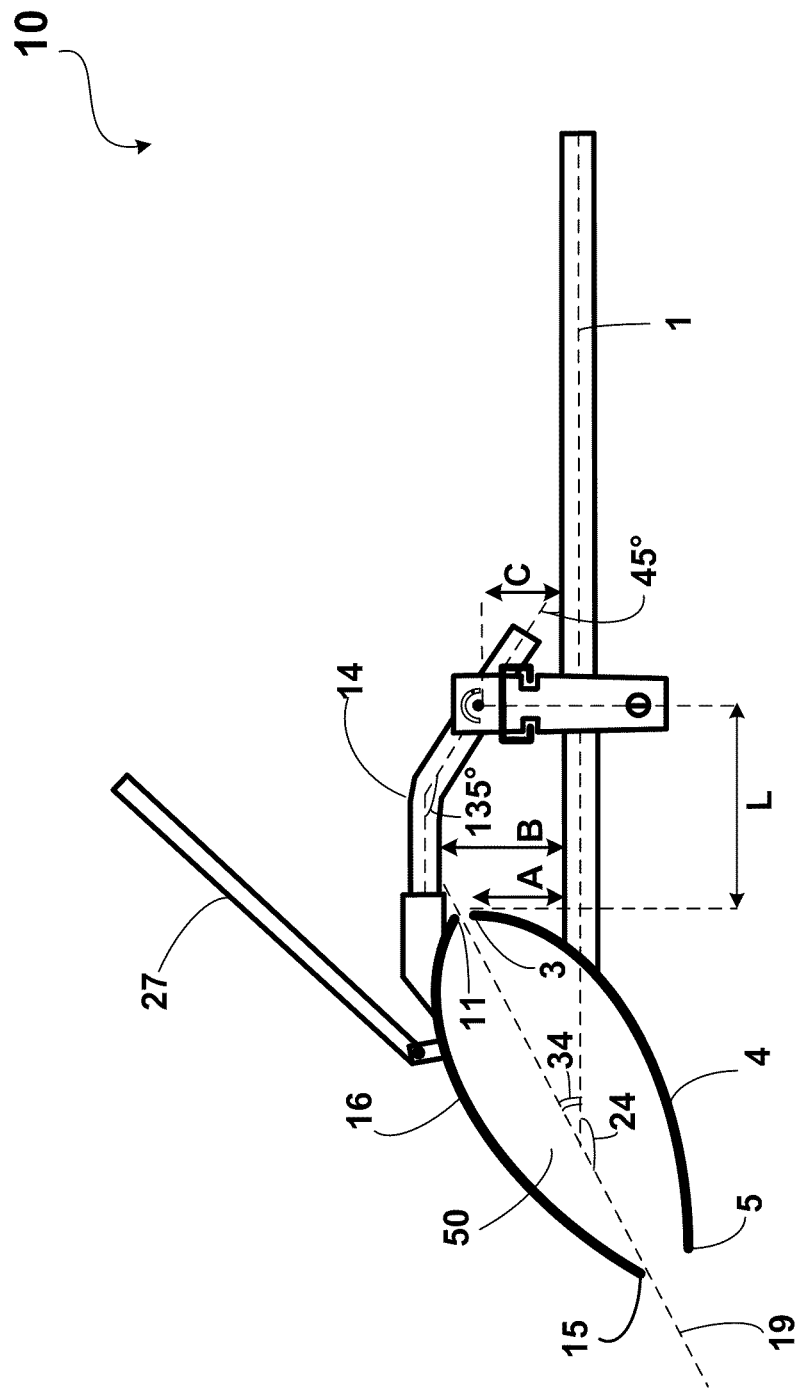
FIG. 3a shows the tool of the embodiment of the invention in a closed position.
Figure 4:
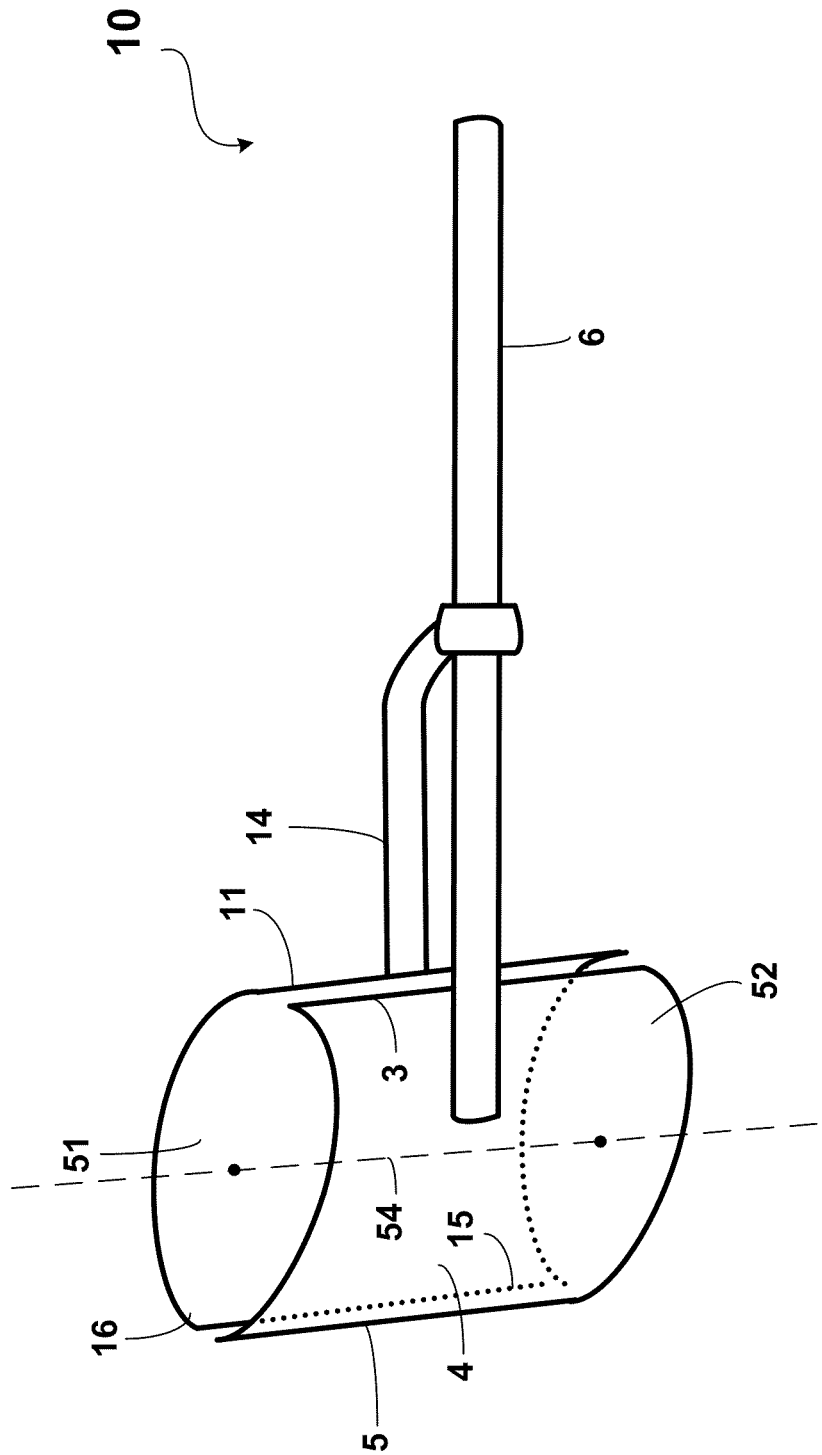
FIG. 4 shows the tool in a vertical position with a vertically oriented tunnel axis.

FIG. 4 shows the tool 10 in the closed position of FIG. 3a, which has been rotated by 90 degrees, to be also referred to as a vertical position of the tool 10. The clamping head 16 and the shovel head 4 form a substantially cylindrical tunnel 50 therebetween, the tunnel 50 having two side openings 51 and 52 at the respective opposite bases of the tunnel 50, and a tunnel axis 54 along the tunnel 50, as shown in FIG. 4.

Ideally, in the closed position of FIG. 3a or rotated closed position of FIG. 4, the top edge 11 of the clamping head 16 is expected to substantially meet the upper edge 3 of the shovel head 4, and the bottom edge 15 of the clamping head 16 is expected to substantially meet the lower edge 5 of the shovel head 4. However, it is not always possible to achieve this ideal arrangement with all shovel variations available commercially, since shovels from different manufacturers come in different shapes and sizes.

Figure 5A:
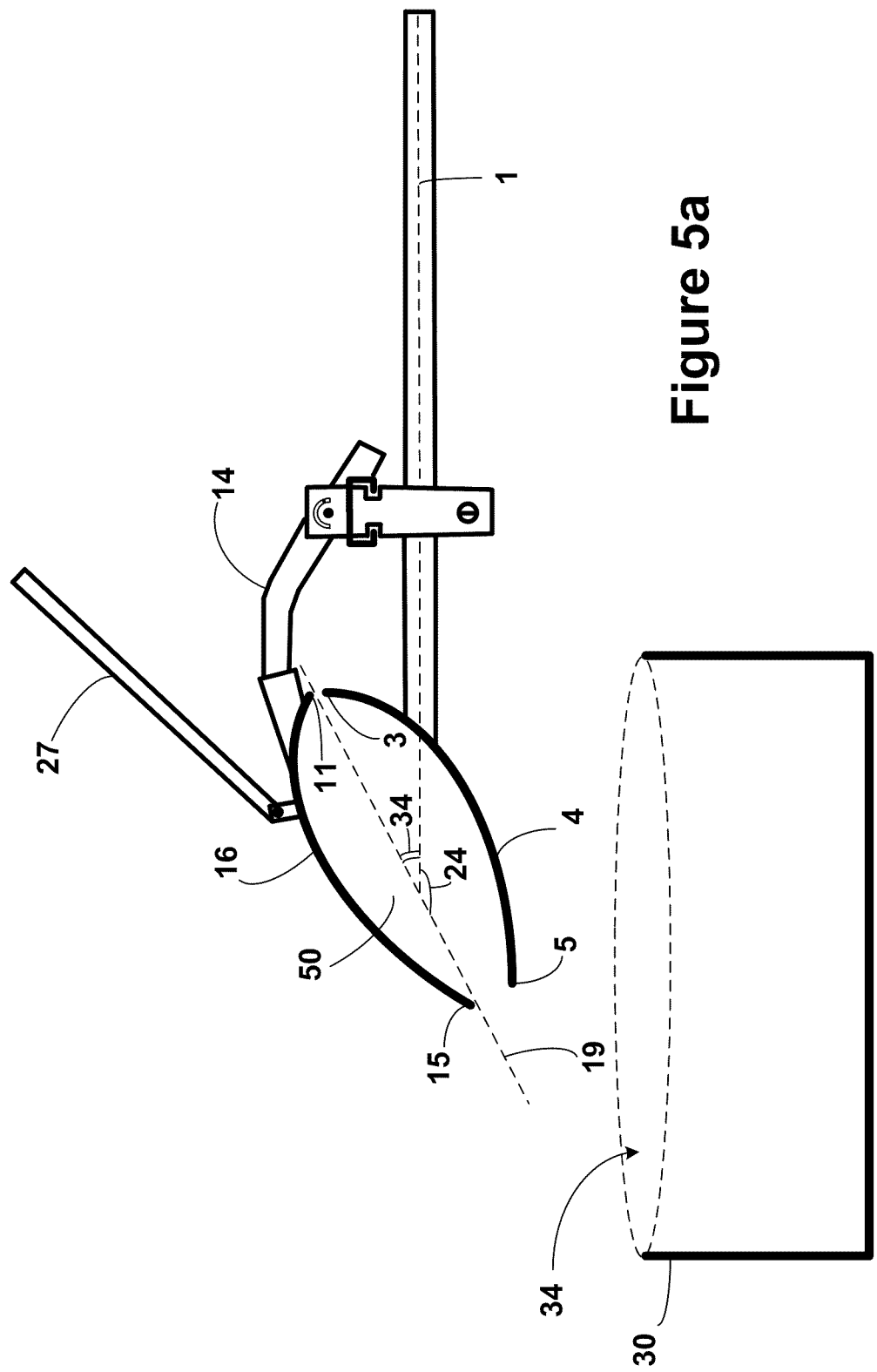
FIG. 5a shows the tool in a position over a container.

However, our research has shown, as illustrated in FIG. 5a, that there exists a reasonable compromise, which can be achieved by selecting an angle 24 between the handle axis 1 and the clamping head plane 19, the clamping head plane being also illustrated in FIG. 3a. Instead of the angle 24, a complementary angle 34 can be used, i.e. angle 34=180°− angle 24. If the angle 24 is larger than 160°, there would be an undesired interference between the top edge 11 of the clamping head 16 and the upper edge 3 of the shovel head 4 for shovels from certain manufacturers. If the angle 24 is smaller than 140°, the gap between the top edge 11 of the clamping head 16 and the upper edge 3 of the shovel head 4 would be large, for example greater than 4.5", for shovels from certain manufacturers, indicating that the lower edge of the clamping head 16 is contacting the lower edge 5 of the shovel head 4 preventing the upper edges between the shovel and clamping head from closing the gap any further. This results in uneven clamping force between the clamping head 16 and the shovel head 4. Therefore, it is advantageous to attach the socket 25 to the clamping head 16 in such a way that the angle 24 is in the range of about [140°, 160°]. Correspondingly, the range for the complementary angle 34 is about [20°, 40°].

As mentioned above, FIG. 3b shows the tool 10 in the open position. The open position of the GTA 8 is required for loading garden debris such as leaves or grass on the shovel head 4. If the tool 10 and the GTA 8 happen to be in the closed position of FIG. 3a, the shovel operator pulls for the handle 27 to bring the tool 10 and the GTA 8 into the open position of FIG. 3b. The handle 27 is designed to eliminate the need for the operator to bend over in order to move the clamping head 16 between the closed and open positions. The handle 27 is rotationally attached to the support bracket 18 using a pin 17 to maintain a proper orientation to the operator's hand as the handle 27 is lifted or lowered. It has been determined experimentally that the handle 27 shorter than about 0.3-0.35 of the length of the handle axis 1, for example, shorter than 15", makes the operator to bend forward to reach for the handle 27, which is inconvenient. However, the handle 27 which is longer than about 0.43-0.5 of the length of the handle axis 1, for example longer than 18", may interfere with an arm of the operator as the tool 10 is rotated to release garden debris. Thus, in the preferred embodiment of the present invention, an optimal length of the handle 27 is determined to be within an interval [0.3, 0.5] of the length of the handle axis 1.

For operating the tool 10 safely, a limiter in the form of a pin 43 slidably movable in a slot 41 is used for limiting a distance between the clamping head 16 and the shovel head 4 in the open position. The intent is to ensure that the clamping head 16 does not close towards the distal end 7 of the shovel handle 6. In the preferred embodiment of the present invention, the slot 41 is a circularly shaped slot cut in the U-bracket 12, and the pin 43 is attached to the first section 29 of the pivot arm 14 so that the pin 43 slides in the slot 41. Since the movement of the pin 43 is limited by the slot 41, the distance between the clamping head 16 and the shovel head 4 in the open position is also limited, thereby preventing the clamping head 16 to close towards the distal end 7 of the shovel handle 6.

Figure 3B:
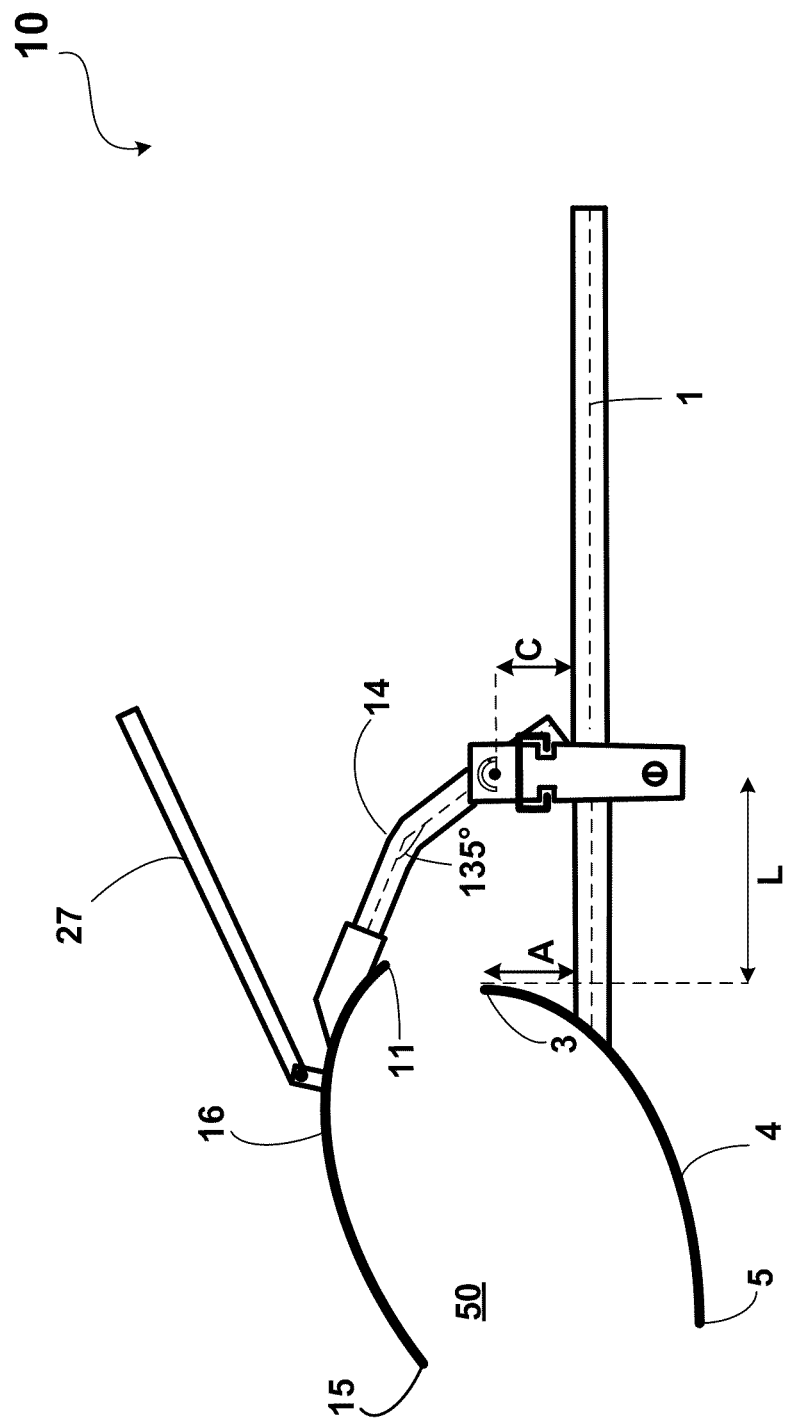
FIG. 3b shows the tool of the embodiment of the invention in an open position.

In operation, having the tool 10 secured in the open position of FIG. 3b, the operator pushes the shovel head 4 against a pile of debris to load a portion of the debris onto the shovel head 4. The loaded debris are secured on the shovel 2 by pushing the handle 27 so as to bring the tool 10 in the closed position of FIG. 3a. Under the weight of the clamping head 16, the loaded debris (not shown) are firmly secured in place within the tunnel 50 formed between the clamping head 16 and the shovel head 4. No effort from the operator is required to maintain pressure of the clamping head 16 on the loaded debris. Due to the design of the tool 10, this function is performed by the force of gravity. This provides convenience to the operator of the tool 10, since the tool 10 can be lifted by using both hands, holding one hand lower on the shovel handle 6 closer to the shovel head 4 for proper leverage of the tool 10.

Then the operator transports the debris to a location over an open container 30 such as a paper bag having a receptacle 34, as shown in FIG. 5a. Certain care needs to be exercised for keeping the tunnel 50 so that the tunnel axis 54 is substantially parallel to the ground during the transportation of the debris to prevent the debris from falling off the tool 10. Immediately before offloading the debris, the tool 10 is positioned above the receptacle 34 of the container 30 as shown in FIG. 5a.

Figure 5B:
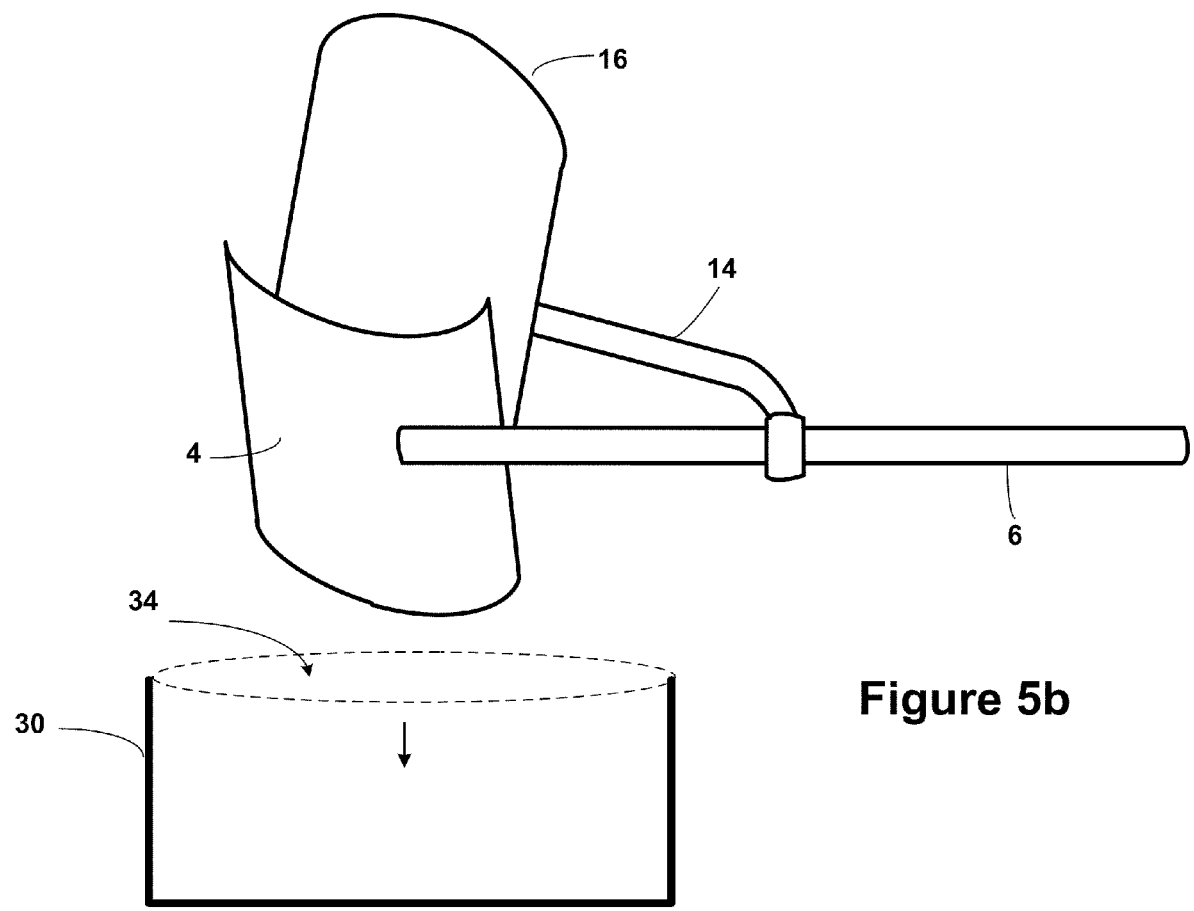
FIG. 5b shows the tool in the debris offloading position.
Figure 5C:
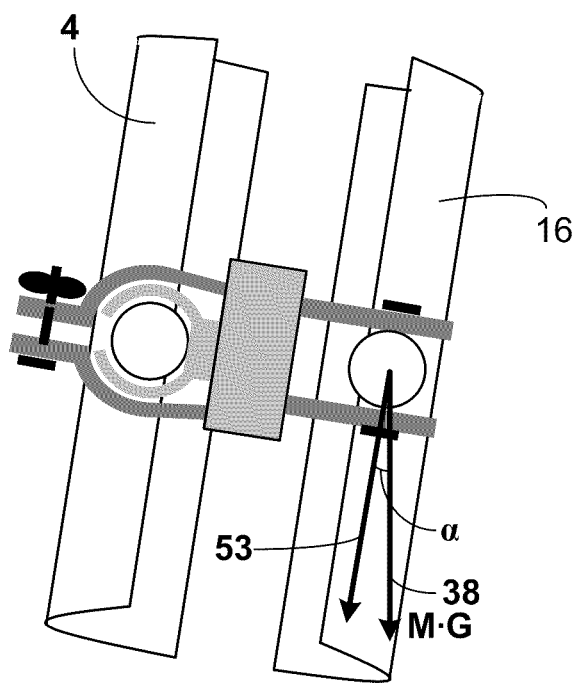
FIG. 5c shows three dimensional bottom view of the tool in the debris offloading position of FIG. 5b.

FIGS. 5b, c, d illustrate the offloading of the debris into the container 30, which is performed by rotating the tool 10 by an angle of rotation β (not shown) so that the tunnel axis 54 is offset from the direction of gravity by an offset angle α, which is smaller than 90 degrees, thus allowing the clamping head 16 to move away from the shovel head 4 under the weight of the clamping head 16.

Figure 5D:
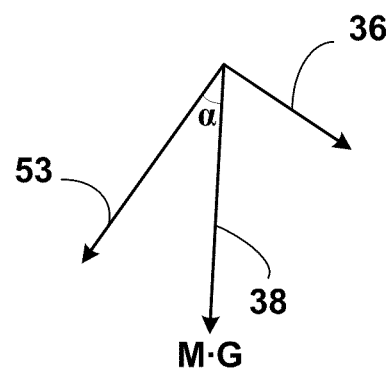
FIG. 5d illustrates forces applied to the attachment.

In FIG. 5d, the weight of the attachment member 26 comprising the clamping head 16, is illustrated as a vector 38 having a component 36, which causes the clamping head 16 to start moving away from the shovel head 4, provided that the component 36 of the weight is large enough to overcome friction in the pivot 28. Conveniently, the friction in the pivot 28 is controlled by the rubber washer mentioned above.

The value of the component 36 of the weight is controlled by the offset angle α so that larger offset angles α give rise to the larger values of the component 36. As a result, pressure produced by the clamping head 16 on the debris gets relieved, and the debris slide down the tunnel 50 allowing for the accurate placement of the debris into the container 30 with minimal spill over. As soon as the debris are unloaded, the tool 10 is rotated back into the position of FIG. 5a, and the tool 10 is ready to be returned to the ground for the next cycle of operation as described above.

It is advantageous and convenient that no effort on the part of the operator is required to operate the clamping head 16 after the shovel 2 is loaded with debris. Due to the design of the tool 10, this function is performed by the force of gravity. Gravity holds the loaded debris in place by pulling the clamping head 16 down towards the shovel head 4 during the transportation to the container 30, gravity opens the clamping head 16 to allow the debris to be offloaded when the tool is turned by the offset angle in a vertical position, gravity pulls the debris down into the container 30 in the vertical position, and gravity also closes the clamping head 16 towards the shovel head 4 to allow an easy transportation of the tool 10 before starting the next cycle.

The role of the operator after loading the debris is to transport the tool 10 into a proper location over the container 30 and to rotate the tool 10. To operate the tool 10 comfortably, that is with a moderate effort, a maximum torque $T_m$ around the shovel handle 6 occurring during the offloading the debris, needs to be moderate.

Figure 6A:
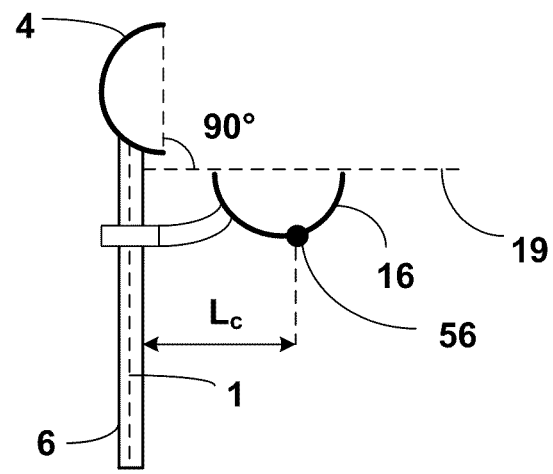
FIG. 6a shows the tool in a position of the maximum torque applied.

The maximum torque is determined with the reference to FIGS. 6a, b. As shown in FIG. 6a, for the maximum torque to occur, the tool 10 is placed in a position with the handle axis 1 parallel to the direction of the force of gravity and with the clamping head 16 opened so that the clamping head plane 19 is perpendicular to the direction of the force of gravity.

Figure 6B:
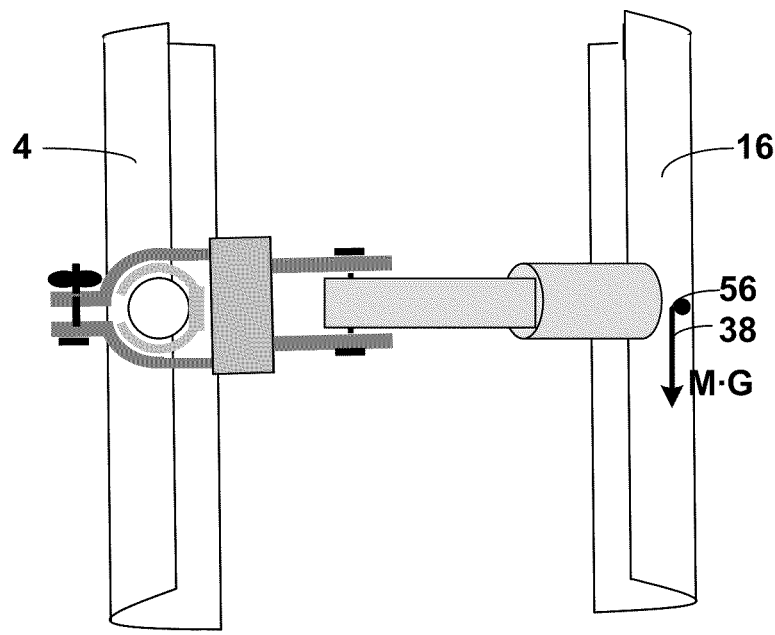
FIG. 6b shows the bottom view of the tool in a position of maximum torque.

For further clarity, FIG. 6b illustrates a 3-dimensional bottom view of the arrangement of FIG. 6a. Assuming that the attachment member 26 has the mass M, and the distance from the center of mass 56 of the attachment member 26 to the handle axis 1 is $L_c$, the maximum torque is defined as $T_m = M \circ G \circ L_c$, where G=9.81 m/s² is the acceleration due to gravity. Our experiments have shown that a maximum acceptable torque $T_{ma}$ is about 1.9 Nm. Therefore, parameters M and $L_c$ need to be chosen so that $T_m < T_{ma}$. For typical operational parameters of the tool 10, M=0.454 kg and $L_c$=0.406 m, we yield $T_m$=1.81 Nm, which is below $T_{ma}$=1.9 Nm. In practice, the torque applied to the shovel handle 6 is only a fraction of the maximum torque $T_m$, since there is no need to open the clamping head 16 for offloading of debris as wide as shown on FIG. 6a. The operational torque $T_o$ is determined by the offset angle α as follows:

$$T_o = T_m \cdot \sin \alpha \tag{1}$$

In the embodiments of the invention, β=90°+α, and α is about α=8°. Accordingly, the operational torque applied to the shovel handle 6 is about $T_o$=0.21 Nm, resulting in about 2 seconds to move the clamping head 16 away from the shovel head 4 to offload the debris into the container 30. Correspondingly, the distance between the lower edge 15 of the clamping head 16 and the bottom edge 5 of the shovel head 4 when the clamping head 16 moves away from the shovel head 4 reaches about 15 cm or less. If a larger size of the clamping head 16 is desired, the mass M can be increased from about 0.454 kg up to about 0.567 kg, provided that $L_c$ is maintained at about $L_c$=0.406 m. The larger mass M reduces the offset angle required to open the clamping head 16 during the offloading of debris. For example, if the mass M is increased to 0.567 kg, the offset angle α can be reduced to about α=6°, while still maintaining the torque below the maximum acceptable torque of 1.9 Nm, as specified above.

Thus, an improved tool 10 for collecting and disposing debris, and the method of operating the tool 10 have been provided.

Figure 7A:
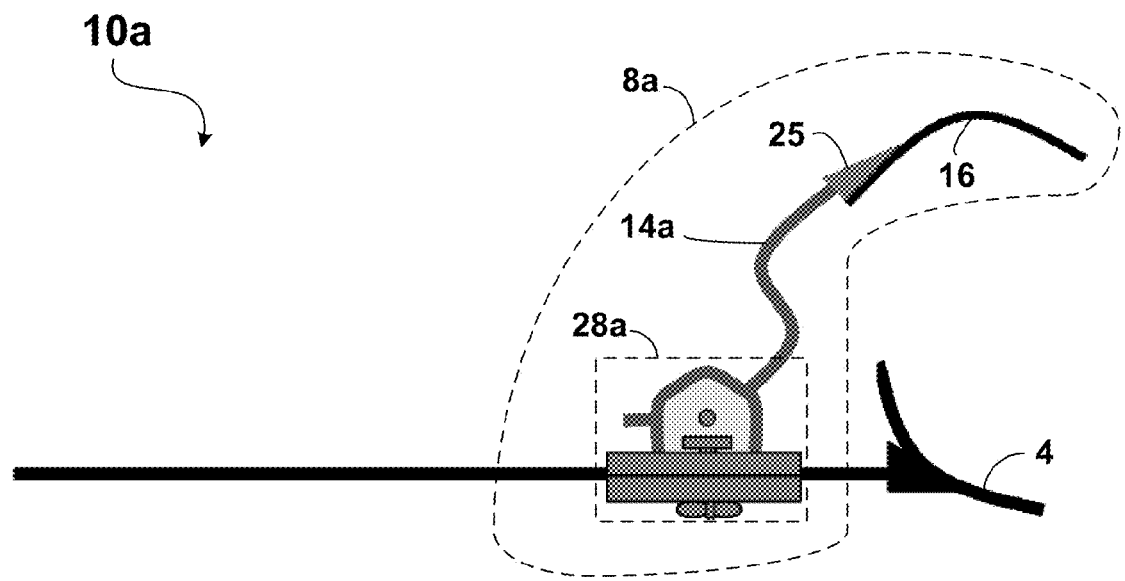
FIG. 7a shows the tool in a closed position according to another embodiment of the invention.

In another embodiment of the invention, the pivot arm 14a shown in FIGS. 7a, b has a different geometry than the pivot arm 14 of FIGS. 3a and 3b. The pivot arm 14a extends forward and then makes about 90° bend upward to clear the shovel head 4 and then makes another about 90° bend forward to fit into the socket 25 of the clamping head 16.

Figure 7B:
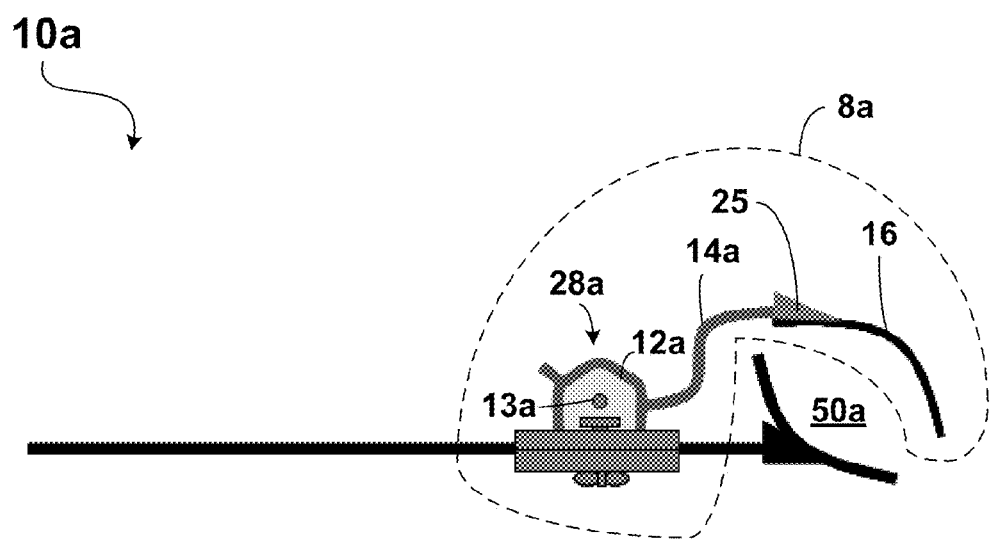
FIG. 7b shows the tool in an open position according to the another embodiments of the invention.

FIGS. 7a and 7b illustrate front and top views of the tool 10a having a GTA 8a according to the another embodiment of the invention respectively. As shown in FIGS. 7a and 7b, the pivot 28a has a design different from the design of the pivot 28 of the preferred embodiment disclosed with the reference to FIGS. 3a and 3b.

Figure 8A:
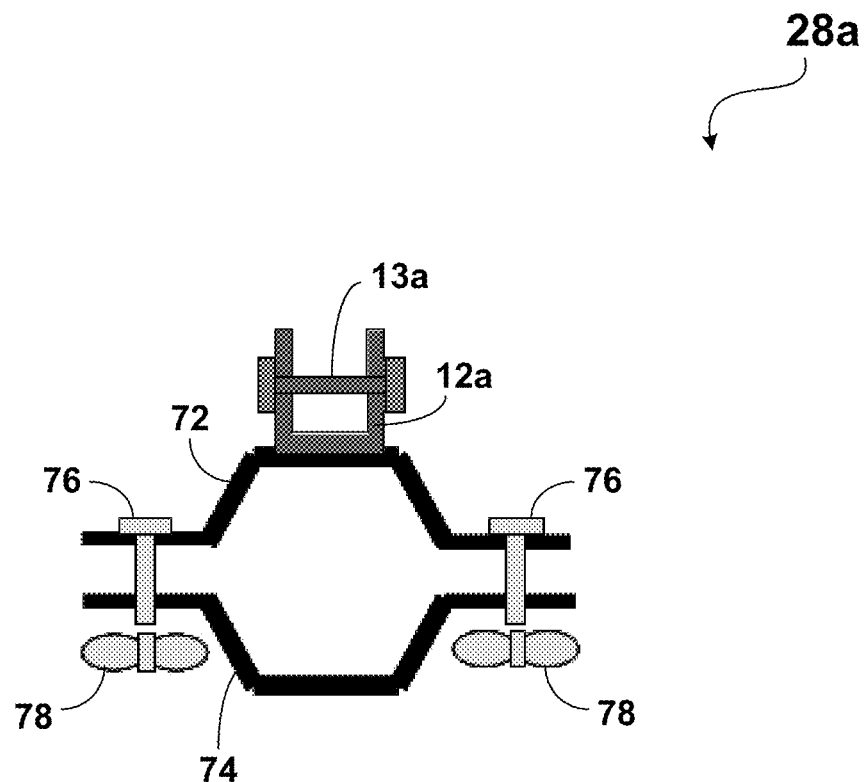
FIG. 8a shows a side view of the pivot of the tool of FIG. 7a in more detail.
Figure 8B:
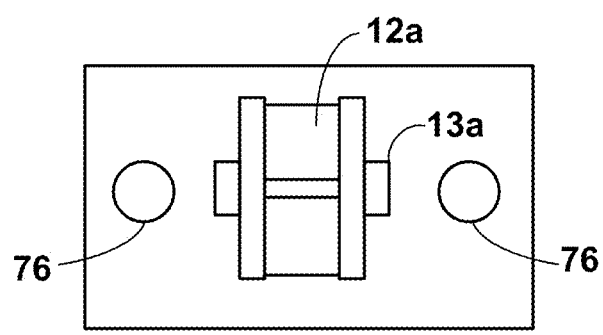

Referring to FIGS. 8a and 8b, the pivot 28a in implemented in the form of a clamp, comprising upper and lower metal plates 72 and 74 bent into a concave shape to accommodate the shovel handle 6. The shovel handle 6 is placed between the upper and lower metal plates 72 and 74, and the metal plates 72 and 74 are held in place with threaded bolts 76 and wing nuts 78 on each side of the metal plates 72 and 74. The pivot 28a is positioned along the shovel handle 6 to align the clamping head 16 of the GTA 8a and the shovel head 4 to form a tunnel 50a therebetween. Conveniently, the pivot 28a is placed no more than 14 inches from the distal end 7 of the shovel handle 6 to permit the operator to grasp the shovel handle 6 low down along the shovel handle 6 to maintain a proper balance when lifting and transporting the tool 10a. The pivot 28a also comprises a U-bracket 12a with a U-bracket pin 13a, which are similar to the U-bracket 12 and the U-bracket pin 13 shown in FIG. 2 above. Elements of the tool 10a of FIGS. 7a, b and 8a, b, which are the same as in the embodiment of the invention shown in FIGS. 3a, b to FIGS. 6a, b, are designated by same reference numerals, and elements that are similar are designated by reference numerals with an additional suffix "a".

Figure 9A:
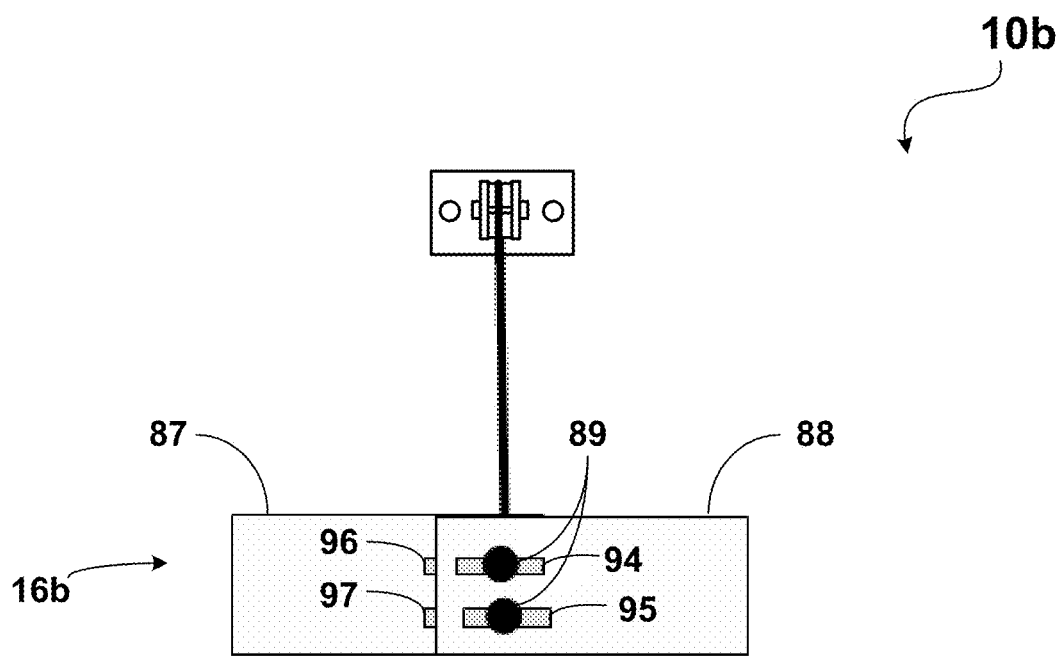
FIGS. 9a, b respectively illustrate top and bottom views of the tool according to yet another embodiment of the invention having an extendable clamping head.
Figure 9B:
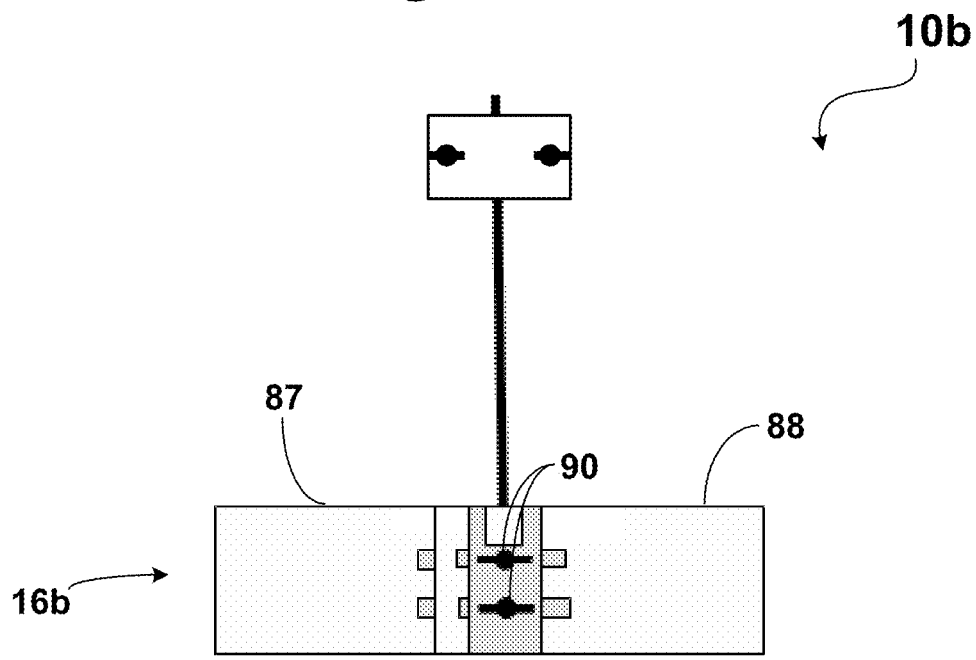
Figure 10:
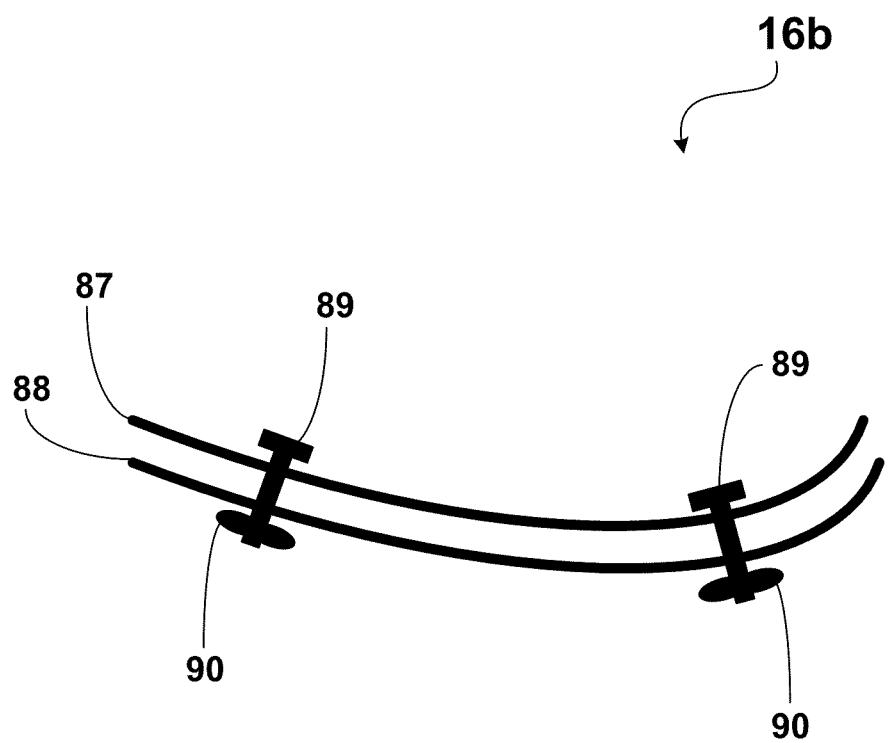
FIG. 10 shows a side view of the extendable clamping head of FIGS. 9a, b.

FIGS. 9a and 9b illustrate top and bottom views of a tool 10b having a GTA 8b respectively, according to yet another embodiment of the invention having an extendable clamping head 16b, and FIG. 10 illustrates a side view of the extendable clamping head 16b of the GTA 8b according to said yet another embodiment of the invention.

The extendable clamping head 16b comprises first and second pieces 87 and 88, which overlap each other. There are two elongated slots 94-95 in the piece 87, and two elongated slots 96-97 in the piece 88 that are aligned with the slots 94-95, with threaded bolts 89 and wing nuts 90 inserted into the aligned slots 94-95 and 96-97 as shown in FIGS. 9a, b. The first and second pieces 87 and 88 are slidably positioned over each other to vary the width of the clamping head 16b. Tightening the wing nuts 90 prevents the first and second pieces 87 and 88 from sliding when the width of the clamping head 16b is configured as desired. In a modification (not shown), the first and second pieces 87 and 88 of the clamping head 16b are slidably positioned over each other to vary the length of the clamping head 16b, instead of its width, in a manner described above.

Elements of the tool 10b of FIGS. 9a, b and 10, which are the same as in the embodiment of the invention shown in FIGS. 3a, b to FIGS. 6a, b, are designated by same reference numerals, and elements that are similar are designated by reference numerals with an additional suffix "b".

It is understood that numerous modifications and variations can be made to the embodiments of the present invention. Although the tool of the embodiments of the invention has been described as the attachment to a conventional shovel, for example, push snow shovel, it is understood that the attachment can be used with other gardening, construction or household tools, which would allow the attachment of the attachment and formation of the tunnel between the attachment and other gardening, construction or household tools, with at least one opening on a side for offloading the debris through the tunnel and for operating the tool by using the force of gravity as described above.

It is contemplated that principles of the embodiments of the present invention may also be used for constructing improved tools for construction industry, for example, tools suitable for collecting and conveniently disposing construction debris, or household tools for similar purposes.

It is understood that various modifications to the pivot 28 or 28a, or the pivot arm 14, 14a of the tools 10, 10a, and 10b can be made as long as they provide a required functionality.

For example, the clamping handle 20 could be a wire, a thread, a rubber band, or any other means to move the clamping head 16 between the closed and the open positions. The clamping handle 20 may also be attached to the pivot arm 14 instead of the clamping head 16. The limiter may be comprised of two pins on the pivot arm 14, one pin being the pin 43 facing one side of the U-bracket 12 and a second pin facing the other opposite side of the U-bracket 12, and two corresponding slots cut at the both sides of the U-bracket 12.

In an alternative embodiment of the present invention, the function of the limiter may be performed by the pivot end 23 provided the pivot arm 14 is extended and the pivot 28 is attached to the pivot arm 14 at a certain distance from the pivot end 23, so that the pivot end 23 would touch the shovel handle 6 in the open position, thereby preventing the clamping head 16 to close towards the distal end 7 of the shovel handle 6.

The pivot 28 may be attached to the pivot arm 14 at the pivot end 23, or alternatively, at a certain distance from the pivot end 23.

The foregoing description of the embodiments of this invention, including any dimensions, angles, or proportions is intended as illustrative. The concept and scope of the invention are limited only by the following claims and equivalents thereof.

What is claimed is:

1. A tool, comprising:
   a shovel having a shovel head for collecting debris and a shovel handle extending therefrom; and
   an attachment, comprising:
      an attachment member, comprising:
         a pivot arm, which is shorter than the shovel handle, the pivot arm having a clamping end and a pivot end;
         a clamping head attached to the clamping end; and
         a pivot attached to the pivot arm for pivotally connecting the attachment to the shovel handle;
      the attachment member being movable between a closed position when the shovel head and the clamping head are juxtaposed face to face forming a tunnel therebetween having a tunnel axis along the tunnel, and an open position when the shovel head and the clamping head are spaced apart from each other;
      the attachment further comprising a limiter for limiting a distance between the clamping head and the shovel head in the open position, wherein the limiter is one of the following:
         a pin, which is attached to the pivot arm and is slidably movable in a slot; or
         the pivot end is configured to act as the limiter.

2. The tool of claim 1, wherein the attachment member is configured to move the clamping head between the closed position and the open position.

3. The tool of claim 1, further comprising a clamping handle pivotally connected to one of the clamping head or the pivot arm.

4. The tool of claim 3, wherein a length of the clamping handle is between 0.3-0.5 of a length of the shovel handle.

5. The tool of claim 1, wherein friction in the pivot and weight of the attachment member are selected so that a component of the weight causing the clamping head move away from the shovel head is greater than the friction when the tool is rotated.

6. The tool of claim 5, wherein an angle of rotation of the tool is such that the tunnel axis is offset from the direction of gravity by an offset angle which is smaller than 90 degrees.

7. The tool of claim 1, wherein a projection of a length of the pivot arm is equal to or shorter than about $1/5$-$1/6$ of a length of the shovel handle.

8. The tool of claim 1, wherein the clamping head has a lower edge and an upper edge, the upper edge being closer to the pivot, the lower edge and the upper edge defining a clamping head plane, the shovel handle having a distal end and a proximal end defining a handle axis, the handle axis being inclined relative to the clamping head plane by about 20-40 degrees.

9. The tool of claim 1, wherein the clamping head comprises a first section and a second section configured to slide against each other for adjusting a width or a length of the clamping head.

10. An attachment for a shovel having a shovel handle and a shovel head for collecting debris, the attachment comprising:
    a pivot arm, which is shorter than the shovel handle, the pivot arm having a clamping end and a pivot end;
    a clamping head attached to the clamping end; and
    a pivot attached to the pivot arm for pivotally connecting the attachment to the shovel handle;
    the clamping head being movable between a closed position when the shovel head and the clamping head are juxtaposed face to face forming a tunnel therebetween, and an open position when the shovel head and the clamping head are spaced apart from each other;
    the attachment further comprising a limiter for limiting a distance between the clamping head and the shovel head in the open position, wherein the limiter is one of the following:
    a pin, which is attached to the pivot arm and is slidably movable in a slot; or
    the pivot end is configured to act as the limiter.

11. The attachment of claim 10, further comprising a means for moving the clamping head between the closed position and the open position.

12. The attachment of claim 10, wherein friction in the pivot and weight of the attachment member are selected so that a component of the weight causing the clamping head move away from the shovel head is greater than the friction when the tool is rotated.

13. The attachment of claim 12, wherein an angle of rotation of the attachment is such that the tunnel axis is offset from the direction of gravity by an offset angle which is smaller than 90 degrees.

14. The attachment of claim 10, wherein the clamping head comprises a first piece and a second piece configured to slide against each other for adjusting a width or a length of the clamping head.

15. The attachment of claim 10, further comprising a clamping handle pivotally connected to one of the clamping head or the pivot arm.

16. The attachment of claim 15, wherein a length of the clamping handle is between 0.3-0.5 of a length of the shovel handle.

17. The attachment of claim 10, wherein a projection of a length of the pivot arm is equal to or shorter than about 1/5-1/6 of a length of the shovel handle.

18. The attachment of claim 10, wherein the clamping head has a lower edge and an upper edge, the upper edge being closer to the pivot, the lower edge and the upper edge defining a clamping head plane, the shovel handle having a distal end and a proximal end defining a handle axis, the handle axis being inclined relative to the clamping head plane by about 20-40 degrees.

19. A method for operating a tool, a shovel having a shovel head for collecting debris and a shovel handle extending therefrom; and an attachment, comprising:
an attachment member, comprising:
a pivot arm, which is shorter than the shovel handle, the pivot arm having a clamping end and a pivot end;
a clamping head attached to the clamping end; and
a pivot attached to the pivot arm for pivotally connecting the attachment to the shovel handle;
the attachment member being movable between a closed position when the shovel head and the clamping head are juxtaposed face to face forming a tunnel therebetween having a tunnel axis along the tunnel, and an open position when the shovel head and the clamping head are spaced apart from each other;
the attachment further comprising a limiter for limiting a distance between the clamping head and the shovel head in the open position, wherein the limiter is one of the following:
a pin, which is attached to the pivot arm and is slidably movable in a slot; or
the pivot end is configured to act as the limiter;
the method comprising:
(a) bringing the attachment in an open position when the shovel head and the clamping head are spaced apart from each other;
(b) loading debris onto the shovel head;
(c) bringing the attachment in a closed position when the shovel head and the clamping head are juxtaposed face to face forming a tunnel therebetween having a tunnel axis along the tunnel and two tunnel openings at respective ends of the tunnel;
(d) transporting the tool to a position above a container having an opening for collecting debris; and
(e) rotating the tool to release the debris through one of the tunnel openings into the opening of the container.

20. The method of claim 19, wherein the step (e) comprises rotating the tool so that a component of a weight of the attachment member causes the clamping head move away from the shovel head, thereby releasing the debris into the container.

* * * * *